No. 733,683. PATENTED JULY 14, 1903.
G. W. STEVENS.
FRUIT CARRIER.
APPLICATION FILED SEPT. 26, 1902.
NO MODEL.

Witnesses
Inventor,
George W. Stevens

No. 733,683. Patented July 14, 1903.

UNITED STATES PATENT OFFICE.

GEORGE W. STEVENS, OF SAN FRANCISCO, CALIFORNIA.

FRUIT-CARRIER.

SPECIFICATION forming part of Letters Patent No. 733,683, dated July 14, 1903.

Application filed September 26, 1902. Serial No. 124,903. (No model.)

*To all whom it may concern:*

Be it known that I, GEORGE W. STEVENS, a citizen of the United States, residing in the city and county of San Francisco, State of California, have invented an Improvement in Fruit and Like Carriers; and I hereby declare the following to be a full, clear, and exact description of the same.

My invention relates to an improved compartment box or case which is adapted for the transportation of fruits and like frail or perishable substances and the protection of each article in a separate cell by itself, with means for ventilation, means for making the compartments adjustable for different sizes of fruits, and details of construction, which will be more fully explained by reference to the accompanying drawings, in which—

Figure 1:
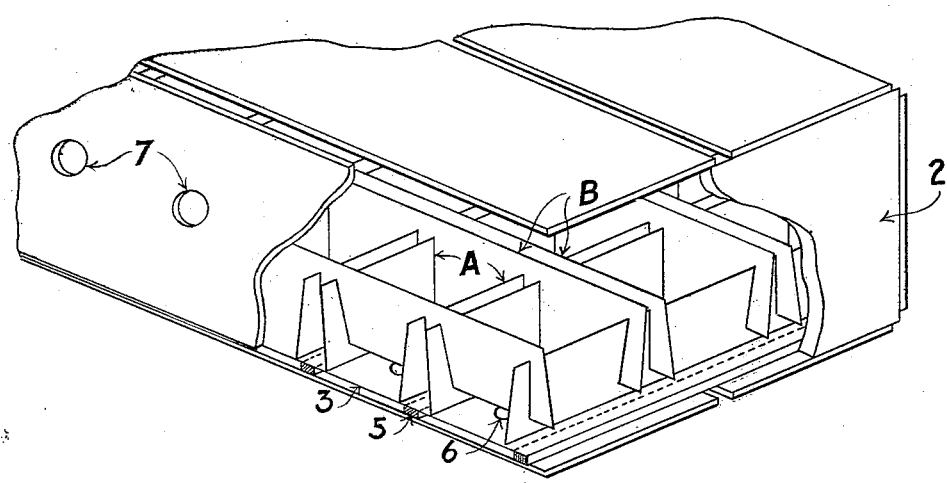
Figure 2:
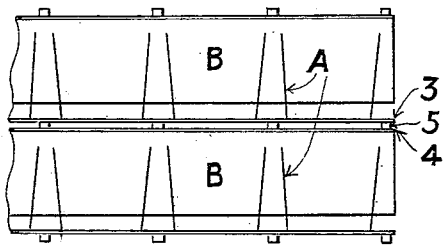
Figure 3:
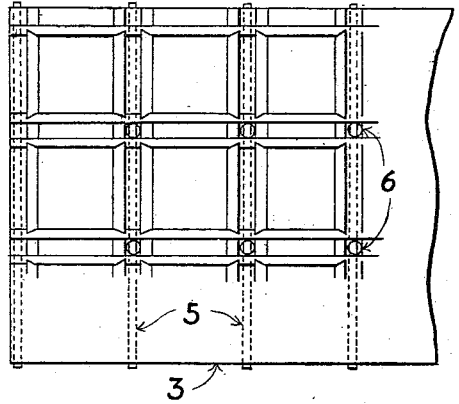
Figure 4:
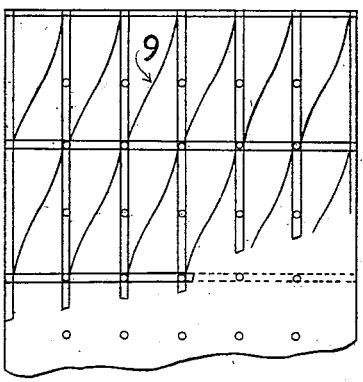

Figure 1 is a sectional perspective view with part of the outer case broken away. Fig. 2 is an end view showing two superposed sets of compartments with intermediate and top and bottom diaphragms. Fig. 3 is a plan of compartments. Fig. 4 is a plan showing diagonal partitions.

In a former patent for fruit-carrier issued to me May 3, 1892, No. 474,105, I have shown a series of vertically-disposed double partitions forming cells with ventilating-spaces. My present invention is an improvement upon the device there shown.

In the present device the compartments are formed by strips A A and B B, crossing each other at right angles and disposed in pairs surrounding each of the cells or compartments. These strips are so disposed that the cell-spaces are made convergent upon either two or all of the sides and having the widest portion at the top and the narrowest at the bottom. The convergence of the strips is effected by making slits in the top of one set of transverse strips and in the bottom of the other set, these sets being cut at such angles as to produce the desired convergence of the cells and the corresponding divergence of the air-spaces, which are located between the cells. The angular arrangement of the strips may be applied to either the longitudinal or the transverse strips, leaving the other pairs standing vertical, or all of the strips may be made to produce the convergence upon all sides of the cells. This construction makes the compartments of such shape that they are self-adjusting—that is, they will fit varying sizes of fruit, the larger fruit being held nearer the upper part, while the smaller fruit will sink farther toward the bottom of the compartment, and in either case the fruit is gently but firmly held by the sides of the compartments. These compartments may be made of pasteboard or any suitable material and are fitted within an exterior box 2, of wood or sufficiently strong material to bear handling and transportation. These boxes may be made of a size to contain a series of compartments, which may be superposed upon each other until the box is filled to the top. Between the compartments thus constructed are horizontal diaphragms. These diaphragms are composed of upper and lower sheets 3 and 4 of material which may be similar to that of which the compartments are made, and these sheets are separated by transverse or other suitably-disposed intermediate strips 5, so that the diaphragms are elastic and the articles within each compartment above are supported by an elastic surface or diaphragm below. Openings 6 are made through these diaphragm-surfaces, so that the openings may communicate with the angles of the adjacent compartments and also with the intermediate spaces between the transverse partitions A and B. The elasticity of these diaphragms provides for a certain amount of vibration during transportation, and this vibration of the diaphragms acts in a measure to circulate the air through the compartments and intervening spaces. The sides of the exterior box are also perforated with openings, as at 7, to allow a free admission and circulation of air through the whole interior.

For the transportation of certain classes of fruit, such as figs and the like, I employ diagonally-disposed partitions 9, extending between opposite angles of compartments, thus making triangular spaces of such shape that figs, pears, or similarly-shaped fruits may be placed in each of the subcompartments thus formed. These diagonal partitions may also be made double, with intervening air-spaces, or they may be made single, if desired, as the shape of the fruit is such that the base of one article will lie in one direction, the base of the other in the opposite direction, and there is little or no pressure of either in line with the greater bulk of its neighbor. These partitions do not extend either to the top or bottom of the partitions A and B, thus leaving a ventilating-space both above and below them.

By this construction I provide a practically automatically adjustable compartment-case suited to fruits of different sizes and character, and those of the most delicate nature can be safely transported on account of the perfect fit within the compartments and the taking up of any slack between each of the upper and lower series of compartments by reason of the double horizontal diaphragms.

Having thus described my invention, what I claim, and desire to secure by Letters Patent, is—

1. A fruit or like carrying crate consisting of compartments each consisting of four walls and with the outer walls of one compartment separated from the contiguous outer walls of an adjacent compartment to provide unobstructed air-spaces surrounding the compartments, said compartments formed of parallel strips so united as to form downwardly-convergent cells, and spaced horizontal diaphragms below the cells and having openings communicating with the spaces between the separated outer walls of said cells.

2. A fruit or like carrying crate consisting of an exterior box, a series of cells or compartments formed by double transversely-disposed strips separated from each other to form surrounding spaces for the circulation of air, said strips provided with interlocking slits, and diagonal strips fitted therein extending between opposite corners of the cells.

3. A compartment carrying-crate consisting of an exterior box, cells formed by transversely-disposed interlocking strips superposed in series from bottom to top of the box, with intermediate diaphragms, diagonally-disposed partitions extending between opposite corners of each of the cells and having spaces above and below.

4. A compartment carrying-crate consisting of an exterior box with air-admission openings, a series of removable cells formed of double transversely-disposed interlocking strips whereby air-spaces are formed around each of the cells, horizontal diaphragms interposed between each series from the bottom to the top, said diaphragms being composed of upper and lower sheets with separating-strips, and having openings made in them and communicating with the interior of the cells and with the air-spaces between them.

5. A compartment carrying-crate consisting of an exterior box having air-openings, a series of cells formed of transversely-disposed interlocking sheets arranged in pairs, the sheets upon opposite sides of each cell converging from top to bottom and forming similarly-shaped air-spaces between the cells, horizontal double perforated diaphragms interposed between each series of cells from bottom to top of the box having open connections with the cells and with the interposed spaces and diagonally-disposed diaphragms extending between opposite angles of the cells and having a depth less than the depths of the cells.

In witness whereof I have hereunto set my hand.

GEORGE W. STEVENS.

Witnesses:
S. H. NOURSE,
JESSIE C. BRODIE.